(12) United States Patent
Yamashita et al.

(10) Patent No.: US 7,534,024 B2
(45) Date of Patent: *May 19, 2009

(54) OPTICAL DEFLECTOR ELEMENT AND LIGHT SOURCE DEVICE

(75) Inventors: Tomoyoshi Yamashita, Kanagawa (JP); Masae Ono, Kanagawa (JP); Makoto Ookawa, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/068,846

(22) Filed: Feb. 12, 2008

(65) Prior Publication Data

US 2008/0144336 A1  Jun. 19, 2008

Related U.S. Application Data

(63) Continuation of application No. 10/547,332, filed as application No. PCT/JP2004/002531 on Mar. 2, 2004, now Pat. No. 7,380,968.

(30) Foreign Application Priority Data

Mar. 3, 2003 (JP) .............................. 2003-055318

(51) Int. Cl.
   *F21V 7/04* (2006.01)
(52) U.S. Cl. ...................... 362/611; 362/610; 362/620; 362/626; 362/330; 362/339; 359/831
(58) Field of Classification Search ................. 362/330, 362/339, 611, 620, 615, 626, 331, 620 K; 349/64, 62; D26/122; 359/838
   See application file for complete search history.

(56) References Cited

U.S. PATENT DOCUMENTS 5,890,791 A   4/1999   Saito
6,088,074 A   7/2000   Suzuki (Continued)

FOREIGN PATENT DOCUMENTS

JP   61-277935   12/1986

(Continued)

*Primary Examiner*—Ali Alavi
*Assistant Examiner*—Evan Dzierzynski
(74) *Attorney, Agent, or Firm*—Morgan, Lewis & Bockius LLP

(57) ABSTRACT

An optical deflector element has a light incoming surface (41) in which light enters and a light outgoing surface (42) located opposite the light incoming surface and from which light exits. In the light incoming surface (41) are arranged elongated prisms (41A) in parallel to each other. Each of the elongated prisms (41A) is formed by a top end flat face (46) located at the top end of the elongated prism and having an inclination angle (b) of 1 to 50 degrees, a first prism face (44) located at one side of the flat face, and a second prism face (45) at the other side. A light source device is formed by combining the optical deflector element, light guide and a primary light source. The light guide has a light incident face in which light emitted from the primary light source enters, and a light emitting face from which guided light exits. The combination above provides a light source device that does not have degradation in luminance and has excellent quality free from visual defects including a black stripe and a Moire pattern.

15 Claims, 3 Drawing Sheets

U.S. PATENT DOCUMENTS 6,692,133 B2 2/2004 Katsu et al.
2005/0271348 A1 * 12/2005 Huang Hsu ................. 385/146

FOREIGN PATENT DOCUMENTS

| JP | 7-230002 | 8/1995 |
| JP | 10-254371 | 9/1998 |
| JP | 11-38209 | 2/1999 |
| JP | 2001-79854 | 3/2001 |
| JP | 2001-143515 | 5/2001 |
| JP | 2001-343507 | 12/2001 |
| JP | 2002-42528 | 2/2002 |
| JP | 2002-245824 | 8/2002 |

* cited by examiner

OPTICAL DEFLECTOR ELEMENT AND LIGHT SOURCE DEVICE

This application is a Continuation of U.S. patent application Ser. No. 10/547,332, filed Sep. 1, 2005, now U.S. Pat. No. 7,380,968 which is a U.S. National Stage Entry of PCT/JP2004/002531, filed Mar. 2, 2004, and claims the benefit of Japanese Patent Application No. 2003-055318 filed on Mar. 3, 2003.

TECHNICAL FIELD

The present invention relates to a light source device of an edge light system, which constitutes a liquid crystal display device used as a display section in a notebook-type personal computer, liquid crystal television, cellular phone, PDA, or the like, and to an optical deflector element used in the light source device, and particularly to improvement in an optical deflector element arranged in the light-emitting face side of a light guide.

BACKGROUND ART

In recent years, color liquid crystal display devices have been used widely in various fields, as monitors for portable notebook-type personal computers, ordinary personal computers, and the like or as display sections in liquid crystal televisions, video-integrated liquid crystal televisions, cellular phones, PDAs, and the like. In accordance with increase of data processing volumes, diversification of needs, compatibility with multimedia, and the like, developments have been eagerly made to achieve liquid crystal display devices having a larger screen size and higher resolution.

A liquid crystal display device is basically constituted by a backlight part and a liquid crystal display part. The backlight part is of a directly under light system in which a primary light source is provided directly under the liquid crystal display part or of an edge light system in which a primary light source is provided so as to face a side end face of a light guide. From the viewpoint of miniaturization of the liquid crystal display device, the edge light system is used frequently.

In recent years, there has been a display device having a relatively small screen size and a relatively narrow range of viewable direction, e.g., a liquid crystal display device used as a display part of a cellular phone. This display device uses such a backlight part of the edge light system that narrows as much as possible the spread angle of light flux emitted from the screen to emit light concentrated on a required angular range, in order to utilize effectively the amount of light generated from a primary light source, from the viewpoint of reduction in power consumption.

JP(A)-2001-143515 has proposed use of a prism sheet in a light source device which is used in a display device having a limited range of viewable direction and emits light concentrated on a relatively narrow range to raise utilization efficiency of the amount of light emitted from a primary light source and to reduce power consumption. The prism sheet has prism formed surfaces on both sides and is disposed adjacent to a light emitting face of a light guide. In this double-sided prism sheet, plural elongated prisms extending in parallel to each other are formed on each of a light incoming surface as one prism formed surface and a light outgoing surface as another prism formed surface. The directions of the elongated prisms are arranged to coincide with each other between the light incoming surface and the light outgoing surface, and the elongated prisms formed on both sides are provided at corresponding positions. As a result of this, light which is emitted from the light emitting face of the light guide so as to have a distribution within an appropriate angular range with a peak in a direction inclined to the light emitting face, is let enter from one prism face of the light incoming surface of the prism sheet and is internally reflected by another prism face thereof. Further, the light is subjected to refraction by the elongated prisms on the light outgoing surface, to concentrate and emit the light in required directions within a relatively narrow range.

According to this kind of light source device, concentrated emission within a narrow angular range is possible. However, the plural elongated prisms formed in parallel to each other on both sides of the prism sheet used as an optical deflector element need to be arranged such that the directions of elongated prisms are matched with each other and the elongated prisms are provided at positions corresponding to each other between the light incoming surface and light outgoing surface. Molding of these parts is therefore complicated.

On the other side, JP(A)-10-254371 has proposed improvement in luminance in the normal direction of a prism sheet. The improvement is achieved by setting the inclination angle of one prism face to 4.7 to 5.7 degrees with respect to the normal direction of the prism sheet, as well as setting the inclination angle of another prism face to 34.2 to 35 degrees with respect to the normal direction of the prism sheet, wherein the one prism face and the another prism face constitute an elongated prism of the prism sheet. However, in this kind of prism sheet in which the inclination angle of one prism face of elongated prism to the normal direction of the prism sheet is thus extremely small, the apex angle of the elongated prism is as small as 40 degrees or so. Consequently, such a fine prism shape is difficult to mold, and black stripes are observed on the basis of "deformation" at top edges of the elongated prisms if such a prism is used to construct a light source device. Thus, there has been a problem in quality level as a light source.

In addition, for the purpose of improving resistance against scratch damages at top edges of elongated prisms without causing a great deterioration in luminance, JP(A)-2001-343507 has proposed formation of flat parts parallel to sheet planes at top edges of the elongated prisms of the prism sheet. If a prism sheet in which flat parts parallel to sheet planes are formed at top edges of the elongated prisms is used to construct a light source device, occurrence of black stripes caused by "deformation" of top edges of the elongated prisms can be suppressed to some extent. However, there is a problem that the contact area between a light guide and the prism sheet increases to thereby cause sticking followed by occurrence of a Moire pattern or deterioration in luminance for a light source device.

DISCLOSURE OF THE INVENTION

An object of the present invention is to provide a light source device with high luminance and high quality, which is constituted with use of an optical deflector element such as a prism sheet or the like, by suppressing occurrence of a problem of black stripes caused by "deformation" of top edges of elongated prisms of the optical deflector element, without lowering luminance.

According to the present invention, to achieve the object as described above, there is provided an optical deflector element comprising: a light incoming surface into which light enters; and a light outgoing surface which is positioned on a side opposite to the light incoming surface and from which the light is emitted, wherein plural elongated prisms are arrayed in parallel with each other on the light incoming surface, and each of the elongated prisms is constituted by a top end flat face having an inclination angle of 1 to 50 degrees and positioned at a top end part of the elongated prism, a first prism face positioned on one side of the top end flat face, and a second prism face positioned on another side of the top end flat face.

In the present invention, the top end flat face may have a size of 0.008 P to 0.088 P in a cross section perpendicular to an elongated direction of the elongated prism where P is pitch of the elongated prism.

In the present invention, at least one of the first and second prism faces may be constituted by a convex curve face. In the present invention, at least one of the first and second prism faces may be constituted by plural faces, and each of the plural faces may be constituted by a flat face or convex curve face. In the present invention, the plural faces may include a flat face adjacent to the top end flat face, and a convex curve face adjacent to the flat face.

In the present invention, the convex curve face may have a cross-section perpendicular to the elongated direction of the elongated prism, the cross-section having an arc-like shape. In the present invention, a ratio r/P of a curvature radius r of the convex curve face to the pitch P of the elongated prisms may be 2 to 50. In the present invention, the prism face constituted by the convex curve face, or any of the first and second prism faces that is constituted by plural faces may have a ratio d/P of a maximum distance d between the prism face and a virtual plane connecting a top edge and a bottom edge to the pitch P of the elongated prisms, the ratio d/P being 0.1 to 5%.

According to the present invention, to achieve the object as described above, there is also provided a light source device comprising: a primary light source; a light guide having a light-incident face into which light emitted from the primary light source enters, and a light-emitting face from which guided light is emitted; and the above-described optical deflector element provided adjacent to the light guide on a side of the light-emitting face thereof.

In the present invention, an inclination angle of the top end flat face of the optical deflector element may be an angle at which peak light in light emitted from the light-emitting face of the light guide does not enter into the optical deflector element through the top end flat face of the optical deflector element. In the present invention, the peak light may be emitted from the light-emitting face in a direction at an angle of 10° to 40° with respect to the light-emitting face. In the present invention, the first prism face of the elongated prism may be positioned closer to the primary light source than the second prism face, the first prism face may be constituted by a flat face, the second prism face may be constituted by a convex curve face or plural faces, and each of the plural faces may be constituted by a flat face or a convex curve face.

BEST MODE FOR CARRYING OUT THE INVENTION

Hereinafter, embodiments of the present invention will be described with reference to the drawings.

Figure 1:
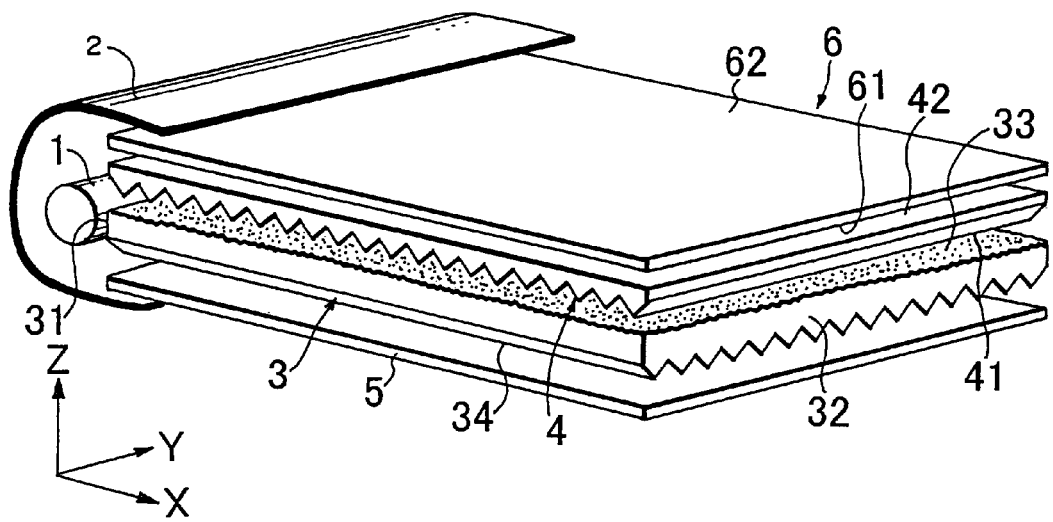
FIG. 1 is a schematic perspective view showing a light source device according to the present invention.

FIG. 1 is a schematic perspective view showing an embodiment of a light source device according to the present invention. As shown in FIG. 1, the light source device of the present invention is constituted by: a light guide 3 having at least one side end face as a light-incident face 31, and a face substantially perpendicular to the light-incident face 31, as a light-emitting face 33; a primary light source 1 facing the light-incident face 31 of the light guide 3 and covered with a light source reflector 2; an optical deflector element 4 provided on the light-emitting face of the light guide 3 so as to be adjacent thereto; a light diffusion element 6 provided on a light outgoing surface 42 of the optical deflector element 4 so as to face the light-emitting face 42; and a light reflection element 5 provided on a back face 34 of the light guide 3 opposite to the light-emitting face 33 so as to face the back face 34.

The light guide 3 is provided in parallel with the XY plane and forms a rectangular plate-like shape as a whole. The light guide 3 has four side end faces. Among these side end faces, at least one side end face of a pair of side end faces parallel to the YZ plane functions as the light-incident face 31. The light-incident face 31 is provided so as to face the primary light source 1. Light emitted from the primary light source 1 enters into the light guide 3 through the light-incident face 31. In the present invention, for example, another primary light source may be provided to face another side end face, e.g., another side end face 32 on the side opposite to the light-incident face 31.

Two major faces substantially perpendicular to the light-incident face 31 of the light guide 3 are positioned substantially in parallel with the XY plane. One of the major surfaces (the upper one in the figure) functions as the light-emitting face 33. On at least one of the light-emitting face 33 and the back face 34, a directive light-emitting functional structure formed of a rough surface, or a directive light-emitting functional structure formed of an elongated lens formed surface in which a number of elongated lenses such as elongated prisms, elongated lenticular lenses, V-shaped grooves, or the like are formed are provided. In this manner, while guiding light entered through the light-incident face 31 inside the light guide 3, light having directivity in emission-light distribution in the plane (XZ plane) perpendicular to the light-incident face 31 and light-emitting face 33 is emitted from the light-emitting face 33. Where a is an angle between the direction of peak light corresponding to a peak of the emission-light distribution in the XZ plane and the light-emitting face 33, this angle a should preferably be 10 to 40 degrees, and the full width at half maximum of the emission-light distribution should preferably be 10 to 40 degrees.

From the viewpoint of improving uniformity of luminance within the light-emitting face 33, it is preferred that the rough surface or elongated lens formed surface formed on the light guide 3 have an average inclination angle θa according to ISO4287/1-1984, which ranges from 0.5 to 15 degrees. More preferably, the average inclination angle θa ranges from 1 to 12 degrees, and much more preferably, the angle θa ranges from 1.5 to 11 degrees. This is because, if the average inclination angle θa is smaller than 0.5 degrees, the amount of light emitted from the light guide 3 tends to be too small to obtain sufficient luminance. Otherwise, if the average inclination angle θa exceeds 11 degrees, a large amount of light is emitted near the primary light source 1, so that light attenuates conspicuously in the X direction in the light-emitting face 33. Therefore, the uniformity of luminance in the light-emitting face 33 tends to decrease. Since the average inclination angle θa of the rough surface or elongated lens formed surface is thus set within the range of 0.5 to 15 degrees, light having an emission characteristic of such strong directivity as described below can be emitted from the light guide 3. Of the light having such strong directivity, the angle a of peak light in the emission-light distribution of light emitted from the light-emitting face 33 falls within a range of 10 to 40 degrees, and the full width at half maximum of the emission-light distribution in the XZ plane vertical to both the light-incident face 31 and the light-emitting face 33 falls within a range of 10 to 40 degrees. The emission direction thereof can be efficiently deflected by the optical deflector element 4. Thus, a surface or planar light source device having high luminance can be provided.

An optimal range of this average inclination angle θa should preferably be set in accordance with the ratio (L/t) between thickness (t) of the light guide 3 and length (L) in the direction in which incident light is propagated. That is, if a light guide 3 having the ratio L/t of about 20 to 200 is used, the average inclination angle θa should preferably be 0.5 to 7.5 degrees, more preferably be in a range of 1 to 5 degrees, and much more preferably be in a range of 1.5 to 4 degrees. If a light guide 3 having the ratio L/t of about 20 or less is used, the average inclination angle θa should preferably be 7 to 12 degrees and more preferably be in a range of 8 to 11 degrees.

The average inclination angle θa can be obtained according to ISO4287/1-1984 by measuring the shape of the rough surface with use of a surface roughness meter of a stylus type and by using the following expressions (1) and (2) from an inclination function f(x) obtained where the coordinate in the measuring direction is x. L is measured length and Δa is a tangent of the average inclination angle θa.

$$\Delta a = (1/L) \int_0^L |(d/dx)f(x)| dx \qquad (1)$$

$$\theta a = \tan^{-1}(\Delta a) \qquad (2)$$

Further, the light guide 3 should preferably have a light emission rate which falls in a range of 0.5 to 5%, and this rate more preferably falls in a range of 1 to 3%. This is because, by setting the light emission rate in these ranges, a sufficient amount of light emitted from the light guide 3 is ensured so that sufficient luminance is obtained, and a large amount of light is prevented from being emitted near the primary light source 1, so that uniformity of luminance at the light-emitting face 33 is raised. This is like in the case of the average inclination angle θa of the rough surface or elongated lens formed surface formed on the light guide 3. Further, by setting the light emission rate within the ranges described above, light having an emission characteristic of such strong directivity as described below can be emitted from the light guide 3. Of the light having such strong directivity, the angle a of peak light in the emission-light distribution of light emitted from the light-emitting face 33 falls within a range of 10 to 40 degrees, and the full width at half maximum of the emission-light distribution in the XZ plane vertical to both the light-incident face and the light-emitting face falls within a range of 10 to 40 degrees. The emission direction thereof can be efficiently deflected by the optical deflector element 4. Thus, a surface light source device having high luminance can be provided.

In the present invention, the light emission rate of light from the light guide 3 is defined as follows. Light intensity ($I_0$) of emitted light at an edge of the light-emitting face 33 on the light-incident face 31 side and light intensity (I) at the position at a distance L from the edge on the light-incident face 31 side satisfies a relationship as expressed by the following expression (3) where t is the thickness of the light guide 3 (the size in the Z direction).

$$I = I_0(A/100)[1-(A/100)]^{L/t} \qquad (3)$$

The constant A is the light emission rate and is a percentage (%) expressing a ratio at which light is emitted from the light guide 3 per unit length (equivalent to the thickness t of the light guide) of the light-emitting face 33 in the direction X perpendicular to the light-incident face 31. The light emission rate A can be obtained from a gradient obtained by plotting a relationship between a logarithm of light intensity of light emitted from the light-emitting face 23, on the vertical axis, and L/t on the horizontal axis.

In order to control the directivity of light emitted from the light guide 3 in a plane (YZ plane) parallel to the primary light source 1, on the other major surface which is not provided with the directive light-emitting functional structure, an elongated lens formed surface where a number of elongated lenses each extending in a direction (substantial X direction) substantially vertical to the light-incident face 31 or at about 80 to 90 degrees to this face are arrayed should preferably be formed. In the embodiment shown in FIG. 1, a rough surface is formed on the light-emitting face 33, and an elongated lens formed surface consisting of a number of elongated lenses extending in a direction substantially vertical to the light-incident face 31 is formed on the back face 34. In the present invention, however, an elongated lens formed surface may be formed on the light-emitting face 33 and the back face 34 may be a rough surface, contrary to the embodiment shown in FIG. 1.

In case of forming elongated lenses on the back face 34 of the light guide 3 or on the light-emitting face 33, as shown in FIG. 1, the elongated lenses may be elongated prisms, elongated lenticular lenses, or V-shaped grooves which extend substantially in the X direction. Of these elongated lenses, it is preferable to use elongated prisms each having a substantially triangular cross-sectional shape in the YZ plane.

In the present invention, in case of forming elongated prisms as the elongated lenses on the light guide 3, the apex angle thereof should preferably be in a range of 70 to 150 degrees. This is because light emitted from the light guide 3 can be concentrated sufficiently by setting the apex angle in this range, so that luminance of the surface light source device can be improved sufficiently. That is, since the apex angle of the elongated prism is set within this range, it is possible to emit concentrated light having the full width at half maximum of 35 to 65 degrees in the emission-light distribution in the plane vertical to the XZ plane and containing peak light so that luminance of the surface light source device can be improved. In case of forming elongated prisms on the light-emitting face 33, the apex angle should preferably be in a range of 80 to 100 degrees. Alternatively, in case of forming elongated prisms on the back face 34, the apex angle should preferably be in a range of 70 to 80 degrees or 100 to 150 degrees.

In the present invention, it is possible to add a directive light-emitting function by mixing and dispersing fine light-diffusive particles inside the light guide, in place of or in conjunction with forming the directive light-emitting functional structure on the light emitting face 33 or back face 34 as described above. The light guide 3 is not limited to one having the cross-sectional shape as shown in FIG. 1 but it is possible to use light guides having various cross-sectional shapes such as a wedge-like shape, boat-like shape, and the like.

Figure 2:
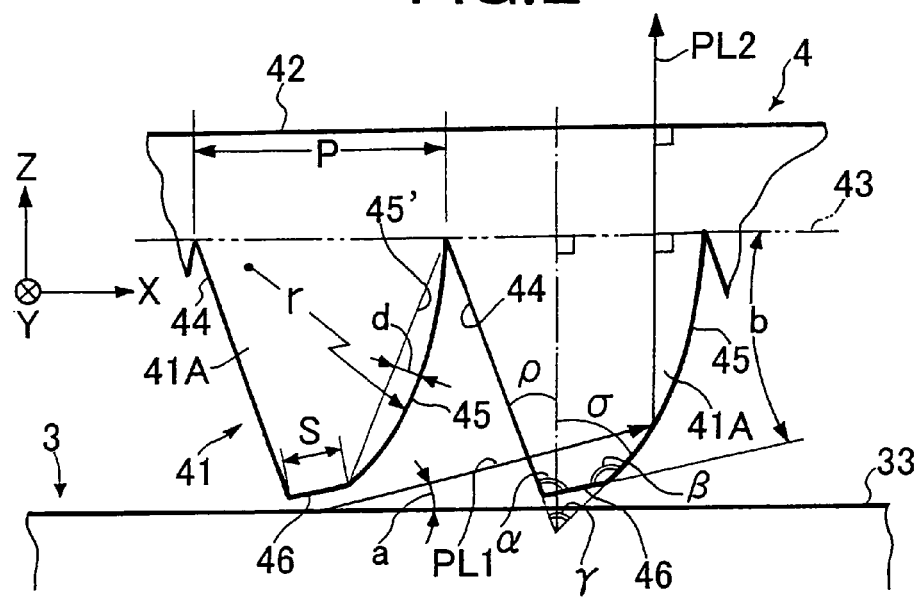
FIG. 2 is a partial cross-sectional view schematically showing a shape of elongated prisms of an optical deflector element according to the present invention.

FIG. 2 is an explanatory view of elongated prisms in the optical deflector element 4. The optical deflector element 4 has two major surfaces. The one of these surfaces that is positioned on the side of the light guide 3 functions as a light incoming surface 41 while the other surface functions as a light outgoing surface 42. On the light incoming surface 41, a large number of elongated prisms 41A are arrayed in parallel. Each elongated prism has a first prism face 44 positioned on the side close to the primary light source and a second prism face 45 positioned on the side far from the primary light source. In the embodiment shown in FIG. 2, the first prism face 44 consists of a flat face, and the second prism face 45 consists of a convex curve face.

In the optical deflector element 4 of the present invention, a flat face (top end flat face) 46 is formed at the top end part of each elongated prism 41A having two prism faces 44 and 45. That is, the elongated prism 41A is constituted by the top end flat face 46, the first prism face 44 positioned on one side of the face 46, and the second prism face 45 positioned on the other side thereof. Since the top end flat face 46 is formed at the top end part of each elongated prism, "deformation" of the shape of the top end of the elongated prism 41A can be prevented when the optical deflector element 4 is mounted on the light guide 3. Accordingly, it is possible to provide a high-quality light source device free from occurrence of black stripes (or black lines) which may caused by the "deformation". In the present invention, an inclination angle b of the top end flat face 46 relative to the elongated prism formed plane (i.e., the plane corresponding to the bottom face of the elongated prism 41A) 43 is set within a range of 1 to 50 degrees. As a result of this, occurrence of Moire pattern due to sticking of the optical deflector element 4 and the light guide 3 to each other can be suppressed, and lowering of luminance due to provision of the top end flat face 46 can be prevented. In particular, the inclination angle of the top end face 46 should preferably be within a range of 5 to 45 degrees because luminance can be improved. This should more preferably be within a range of 7 to 35 degrees.

Figure 3:
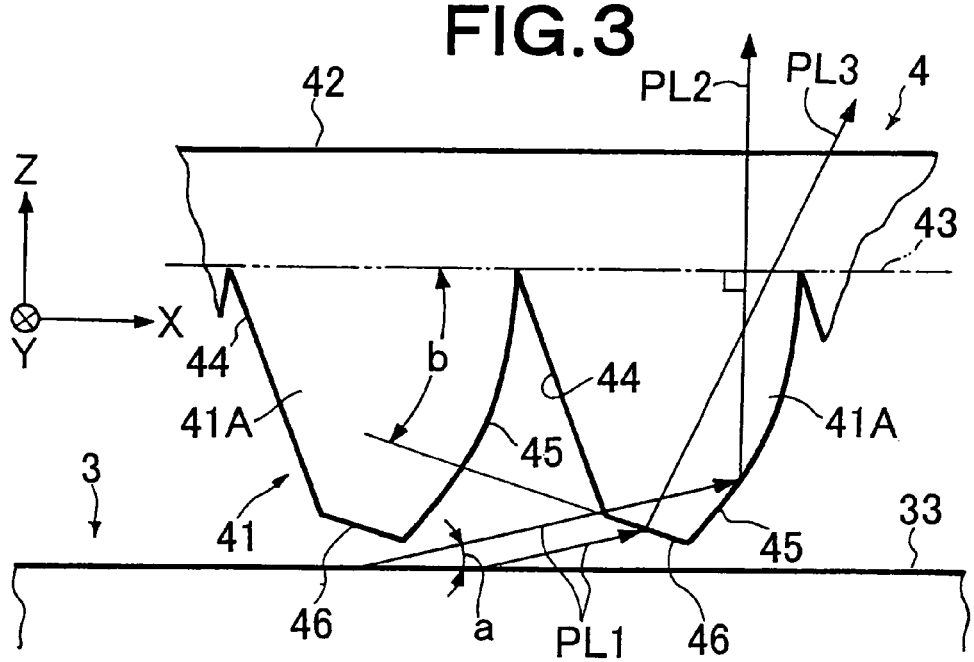
FIG. 3 is a partial cross-sectional view schematically showing a shape of elongated prisms of an optical deflector element according to the present invention.

If, as shown in FIG. 2, the top end flat face 46 has such an inclination angle b at which the face 46 slopes upward to the right, i.e. toward the side opposite to the primary light source, the top end flat face 46 should preferably have an inclination angle b substantially equal to or greater than the inclination angle of peak light PL1 relative to the elongated prism formed plane 43, of the light entering into the optical deflector element 4, i.e., of the light emitted from the light-emitting face 33 of the light guide 3, in order to improve the luminance of the light source device. This is because, by thus arranging the inclination angle b of each top end flat face 46, the peak light PL1 emitted from the light guide 3 does not substantially enter into the optical deflector element 4 through the top end flat faces 46 any more but enters into the optical deflector element 4 through the first prism face 44. Most of this peak light is totally reflected by the second prism face 45 and is emitted, as deflected peak light PL2, in the normal direction of the elongated prism formed plane 43. On the other side, if each top end flat face 46 has a smaller inclination angle b than the inclination angle of the emitted peak light PL1 relative to the elongated prism formed plane 43 or has an inclination angle b which slopes upward to the left, i.e. toward the side of the primary light source, as shown in FIG. 3, part of the peak light PL1 emitted from the light guide 3 enters into the optical deflector element 4 through the top end flat faces 46. This part of light is refracted here and is emitted, as deflected peak light PL3, in a direction greatly shifted from the normal direction of the elongated prism formed plane 43. This tends to cause lowering of luminance in the normal direction of the elongated prism formed plane 43.

Further, in the present invention, the size (hereinafter also referred to as "length") S of the top end flat face 46 in the cross-section (XZ cross-section) of each elongated prism 41A perpendicular to the elongated direction of the elongated prism should preferably be within a range of 0.008 P to 0.088 P where P is the pitch of the elongated prisms (the size in the X direction of the bottom face of the elongated prism 41A), more preferably be within a range of 0.017 P to 0.053 P, and much more preferably be within a range of 0.017 P to 0.035 P. This is because lowering of the luminance tends to be greater if the length of the top end flat face 46 exceeds 0.088 P. On the contrary, if this length is smaller than 0.008 P, molding of a fine elongated prism shape tends to be difficult.

For the optical deflector element 4 of the present invention, it is preferable that the inclination angle $\rho$ of the first prism face 44 is 5 to 20 degrees, the inclination angle $\sigma$ of the second prism face 45 is 35 to 40 degrees, and the absolute value ($|\rho-\sigma|$) of difference between $\rho$ and $\sigma$ is 15 to 35 degrees because high luminance can be obtained for a light source device. The inclination angles $\rho$ and $\sigma$ of the prism faces 44 and 45 mentioned herein are angles of the prism faces 44 and 45 relative to the normal of the elongated prism formed plane 43 at the intersecting portions of the prism faces 44 and 45 and the top end flat face 46. Thus, in the optical deflector element 4 in which the inclination angle $\sigma$ of the first prism face 44 is small and the sum $\gamma$ of the inclination angles $\rho$ and $\sigma$ (i.e., the angle at which the first prism face 44 and the second prism face 45 intersect each other) is about 40 to 60 degrees, occurrence of black stripes caused by "deformation" of top ends of elongated prisms is conspicuous unless top end flat faces 46 are not formed. Therefore, the present invention is suitable for improvement in characteristics of the optical deflector element 4 of this kind. If the second prism face 45 consists of a curved face as shown in FIG. 2, the inclination angle $\sigma$ means the angle defined between the normal of the elongated prism formed surface 43 and the tangent plane of the curved face at the intersecting portion between the curved face and the top end flat face 46. The same applies also to the case where the first prism face 44 consists of a curved face. In FIG. 2, an angle defined between the first prism face 44 and the top end flat face 46 is indicated by $\alpha$ while another angle defined between the second prism face 45 and the top end flat face 46 is indicated by $\beta$.

In the embodiment shown in FIG. 2, the second prism face 45 is a convex curve face (in particular, the XZ cross-section perpendicular to the Y direction which is the elongated direction of the elongated prism 41A forms an arc-like shape). Thus, by forming at least the second prism face 45 as a convex curve face, the light concentration effect of the optical deflector element 4 can be improved more, and luminance of the light source device can be improved much more. In this case, a ratio (r/P) of the curvature radius (r) of the convex curve face to the pitch (P) of the elongated prism 41A should be preferably within a range of 2 to 50, more preferably within a range of 3 to 30, and much more preferably within a range of 5 to 12. This is because, if r/P is smaller than 2 or greater than 50, a sufficient light concentration characteristic cannot be exhibited, and the luminance tends to decrease. Also, in the present invention, the convex curve face constituting the second prism face 45 is not limited to the one having a cross-sectional arc-like shape defined by r/P as described above but may have a cross-section which is not an arc-like shape. In this case, a ratio (d/P) of the maximum distance d between a virtual plane 45' and the convex curve face to the pitch (P) of elongated prisms should preferably be 0.1 to 5% wherein the virtual plane 45' connects the top edge and bottom edge of the convex curve face forming the second prism face 45. This is because, if d/P is smaller than 0.1% or greater than 5%, the light concentration characteristic tends to deteriorate so that the luminance tends to be improved insufficiently. The ratio d/P should be more preferably within a range of 0.2 to 3%, and much more preferably within a range of 0.2 to 2%.

In the present invention, not only this kind of convex curve face but also at least the second prism face 45 may be constituted by two or more flat faces which have inclination angles (to the normal of the elongated prism formed plane 43) which are different from each other. The inclination angles of these flat faces may be set so as to decrease for the respective ones closer to the light outgoing surface. Differences between inclination angle of the flat face at the position closest to the light outgoing surface and other inclination angle of the flat face at the position furthest from the light outgoing surface may be 15 degrees or less. In this manner, it is also possible to exhibit strong light-concentration effect, and to obtain high luminance of the light source device. The differences between inclination angle of the flat face at the position closest to the light outgoing surface and other inclination angle of the flat face at the position furthest from the light outgoing surface should be preferably in a range of 0.5 to 10 degrees and more preferably in a range of 1 to 7 degrees. By constructing the second prism face 45 in a structure as described above, an optical deflector element having a desired light concentration characteristic can be designed with ease, and optical deflector elements having a constant optical characteristic can be manufactured stably.

Also, in the present invention, at least one of the flat faces having different inclination angles as described above may be replaced with a convex curve face and all of the flat faces may be replaced with convex curve faces. In this case, the shape of the convex curve face may have an XZ cross-section having an arc-like shape or not-arc-like shape. Further, in case of constituting the second prism face by plural convex curve faces, the shapes of the respective convex curve faces should preferably differ from each other. In this case, a convex curve face having an arc-like cross-section and a convex curve face having a not-arc-like cross-section may be combined with each other although at least one of the convex curve faces should preferably have a not-arc-like cross-section. In case where plural convex curve faces each have an arc-like cross-section, the curvatures of the convex curve faces may be different from each other. The not-arc-like shape as described above may be part of an elliptic shape, part of a parabolic shape, or the like.

With respect to these convex curve faces, the ratio (r/P) of the curvature radius (r) to the pitch (P) of the elongated prisms should be preferably within a range of 2 to 50, more preferably within a range of 3 to 30, and more preferably within a range of 5 to 12.

When the second prism face is constituted by plural flat faces or convex curve faces which respectively have different inclination angles, the ratio (d/P) of the maximum distance d between a virtual plane (corresponding to 45' in FIG. 2) and the plural flat faces or convex curve faces (actual prism faces) to the pitch (P) of elongated prisms should preferably be 0.1 to 5% in order to maintain a sufficient light-concentration characteristic, like in a previous case, wherein the virtual plane connects the top edge and bottom edge (valley) of the second prism face. This ratio (d/P) should be more preferably within a range of 0.2 to 3%, and much more preferably be within a range of 0.2 to 2%.

These flat faces and convex curve faces having different inclination angles are typically designed such that peak angle in the emission-light luminance distribution (in the XZ plane) when light totally reflected by each of the flat faces and convex curve faces is emitted from the light outgoing surface 42 is substantially constant. However, the peak angle need not always be constant but the faces can be designed such that all peak angles are within a range of 15 degrees or less. All the peak angles should be preferably 10 degrees or less, more preferably 7 degrees or less, and much more preferably 5 degrees or less.

The primary light source 1 is a linear light source extending in the Y direction. For example, a fluorescent lamp or cold-cathode tube can be used as the primary light source 1. In the present invention, the primary light source 1 is not limited to a linear light source but it is possible to use a point light source such as a light emission diode (LED) light source, halogen lamp, metal halide lamp, or the like. In particular, in case of use in a display device having a relatively small screen size in a cellular phone, PDA, or the like, it is preferable to use a small point light source such as a LED. Further, not only a primary light source 1 is placed on one side end face of the light guide 3 as shown in FIG. 1 but also another primary light source may be placed on the other opposite side end face if necessary.

Figure 4:
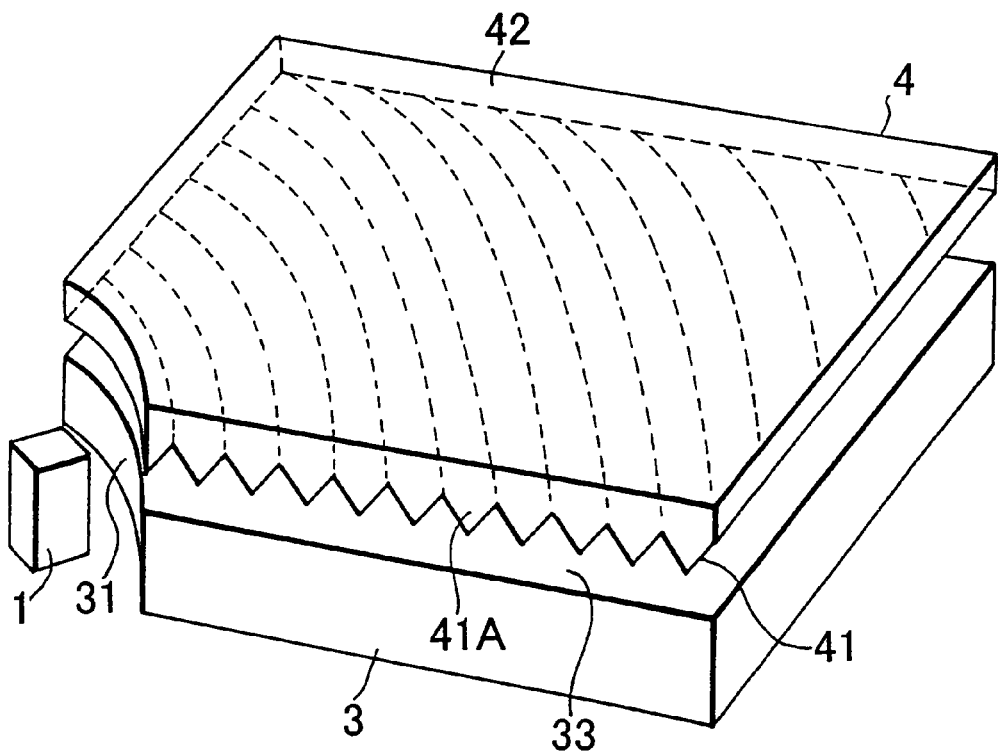
FIG. 4 is a schematic perspective view showing a light source device according to the present invention.

For example, as shown in FIG. 4, if a substantial point light source such as an LED light source is positioned at a corner or the like of the light guide 3 and used as primary light source 1, light which has entered into the light guide 3 propagates inside the light guide 3 radially about the primary light source 1 as a substantial center in the same plane as the light-emitting face 33. Likewise, emitted light from the light-emitting face 33 is emitted also radially about the primary light source 1. In order that this emitted light emitted radially is deflected efficiently in a desired direction regardless of emitted directions, the elongated prisms 41A formed on the light incoming surface 41 of the optical deflector element 4 should preferably be arranged in parallel to each other substantially like an arc, surrounding the primary light source 1. By thus arranging the elongated prisms 41A in parallel to each other substantially like an arc so as to surround the primary light source 1, most of light emitted radially from the light-emitting face 33 enters substantially vertically into the elongated prisms 41A of the optical deflector element 4, in the same plane as the light-emitting face 33. In this manner, emitted light can be efficiently oriented in a particular direction over all areas of the light-emitting face 33 of the light guide 3, so that uniformity of luminance can be improved. For the substantially arc-like elongated prisms 41A formed on the optical deflector element 4, it is preferable to select the extent expressing how much the elongated prisms are like an arc, in accordance with the distribution of light propagating through the light guide 3. In the same plane as the light-emitting face 33, most of light emitted radially from the light-emitting face 33 should preferably enter substantially vertically into the elongated prisms 41A of the optical deflector element 4. Specifically, an example will be that the elongated prisms are arranged such that the radius of the substantial arc gradually increases like substantially concentric circles about the point light source 1 such as a LED as the substantial center of the circles. The range of the radius of the substantially arc-like shape of each elongated prism 41A is determined, depending on a positional relationship or size between the position of the point primary light source 1 in a surface light source device and an effective area of the surface light source device corresponding to a display area of a liquid crystal display device.

The light source reflector 2 guides light from the primary light source 1 to the light guide 3 with little loss. As material of the reflector 2, for example, a plastic film having a metal-deposited reflection layer on the surface thereof can be used. As shown in FIG. 1, the light source reflector 2 is wound around from the outer face of an edge part of the light reflection element 5 to an edge part of an emitting face of the light diffusion element 6 through the outer face of the primary light source 1. Alternatively, the light source reflector 2 can be wound around from the outer face of the edge part of the light reflection element 5 to the edge part of the light outgoing face of the optical deflector element 4 through the outer face of the primary light source 1, avoiding the light diffusion element 6. Alternatively, the light source reflector 2 can be wound around from the outer face of the edge part of the light reflection element 5 to the edge part of the light emitting face of the light guide 3 through the outer face of the primary light source 1, also avoiding the optical deflector element 4.

A reflection member similar to this kind of light source reflector 2 can be attached to a side end face of the light guide 3 other than the side end face 31. As the light reflection element 5, for example, a plastic sheet having a metal-deposited reflection layer on the surface of the element can be used. In the present invention, in place of a reflection sheet, as the light reflection element 5, a light reflection layer or the like formed on the back face 34 of the light guide 3 by metal deposition or the like can be used.

The light guide 3 and optical deflector element 4 of the present invention can be made of synthetic resins having a high light transmittance. Examples of this kind of synthetic resin are methacrylic resin, acrylic resin, polycarbonate resin, polyester resin, and vinyl chloride resin. In particular, the methacrylic resin is excellent in heat resistance, physical characteristics, and molding-processability and is therefore most suitable. Methacrylic resin of this kind contains methyl methacrylate as a major constituent and should preferably contain 80 wt % or more of methyl methacrylate. The surface structures of rough surface, elongated prism formed surface or the like of the light guide 3 and optical deflector element 4 may be formed by thermally pressing a transparent synthetic-resin plate with use of a mold member having a desired surface structure. Alternatively, when molding is carried out, shaping may be carried out by screen printing, extrusion molding, injection molding, or the like. In addition, a structural face may be formed by use of heat- or light-curable resin. Further, a rough surface structure or an elongated lens formed surface structure may be formed of active energy curable resin, on the surface of a transparent base member such as a transparent film or sheet made of polyester resin, acrylic resin, polycarbonate resin, vinyl chloride resin, polymethacrylimide resin, or the like. This kind of sheet may be jointed to and integrated with another transparent base member by a method of adhesion, fusion bond, or the like. As the active energy curable resin, a multifunctional (meth)acrylic compound, vinyl compound, (meth)acrylic esters, allyl compound, metal salt of (meth)acrylic acid, or the like may be used.

Further, in the present invention, the light diffusion element 6 can be provided adjacent to the light outgoing surface 42 of the optical deflector element 4, in order to control appropriately the viewable range in accordance with purposes without lowering the luminance as little as possible, in a light source device improved to have higher luminance. By thus providing the light diffusion element 6, it is possible to improve quality while preventing glare and unevenness in luminance which are factors causing deterioration in quality.

The light diffusion element 6 may be formed to be integrated with the optical deflector element 4 on the light outgoing surface side thereof. Alternatively, the light diffusion element 6 may be mounted separately on the light outgoing surface of the optical deflector element 4. The light diffusion element 6 should preferably be provided separately. In case of mounting the light diffusion element 6 separately, a concave/convex structure should preferably added to a light incident surface 61 of light diffusion element 6 facing the optical deflector element 4 in order to prevent sticking of the optical deflector element 4 and the light incident surface 61. Similarly, with respect to a light emitting surface 62 of the light diffusion element 6, it is necessary to consider sticking to a liquid crystal display element arranged on this surface, and a concave/convex structure should preferably be added to the light emitting surface 62 of the light diffusion element 6. If this concave/convex structure is added only for the purpose of preventing sticking, the structure should preferably be arranged to have an average inclination angle of 0.7 degrees or more. The average inclination angle should be more preferably, 1 degree or more, and much more preferably 1.5 degrees or more.

Figure 5:
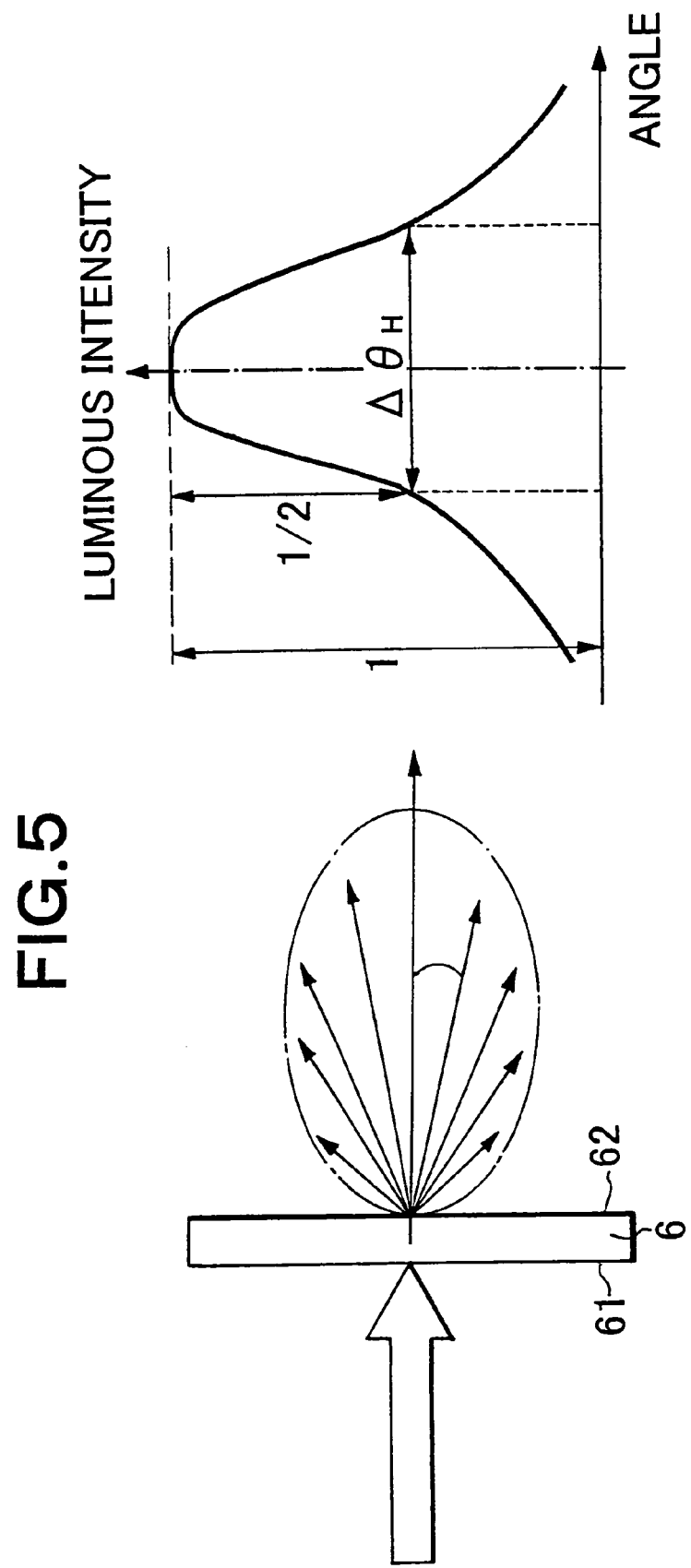
FIG. 5 is a diagram explaining emitted-light distribution of a light diffusion element.

In the present invention, it is preferable to use the light diffusion element 6 having a light diffusion characteristic of appropriately diffusing light emitted from the optical deflector element 4, in consideration of balance among luminance characteristics, visibility, quality, and the like. That is, if the light diffusion characteristic of the light diffusion element 6 is too low, it is difficult to widen sufficiently the viewable angle. Consequently, the visibility is lowered and the effect of improving quality is not sufficient sometimes. Inversely, if the light diffusion characteristic is too high, the effect of narrowing the view field by the optical deflector element 4 is impaired, and the total beam transmittance decreases, so that the luminance tends to decrease. Hence, for the light diffusion element 6 of the present invention, there is used an element in which the full width at half maximum of the emission-light distribution when parallel light is let enter is within a range of 1 to 13 degrees. The full width at half maximum of the emission-light distribution of the light diffusion element 6 should be preferably within a range of 3 to 11 degrees, and more preferably within a range of 4 to 8.5 degrees. In the present invention, the full width at half maximum of the emission-light distribution of the light diffusion element 6 indicates an extent expressing how the parallel beam which has entered into the light diffusion element 6 is diffused and spreads, as shown in FIG. 5. It is the angle ($\Delta\theta_H$) of the full width of the spreading angle at the half value with respect to the peak value in the light intensity distribution of emitted light which is transmitted and diffused through the light diffusion element 6.

The light diffusion characteristic as described above can be provided by mixing a light diffusion agent into the light diffusion element 6 or by providing at least one of surfaces of the light diffusion element 6 with a convex/concave structure. The extent to which the concave/convex structure is formed differs between the case of forming this structure on one surface of the light diffusion element 6 and the case of forming this structure on both surfaces thereof. In case of forming the concave/convex structure only on one surface of the light diffusion element 6, the average inclination angle should be preferably within a range of 0.8 to 12 degrees, more preferably within a range of 3.5 to 7 degrees, and much more preferably within a range of 4 to 6.5 degrees. Otherwise, in case of forming the concave/convex structure on both surfaces of the light diffusion element 6, the average inclination angle of the concave/convex structure formed on one surface should be preferably within a range of 0.8 to 6 degrees, more preferably within a range of 2 to 4 degrees, and much more preferably within a range of 2.5 to 4 degrees. In this case, in order to suppress lowering of the total beam transmittance of the light diffusion element 6, the average inclination angle on the side of the light incident surface of the light diffusion element 6 should be preferably greater than the average inclination angle on the side of the light emitting surface thereof. From the view point of improving the luminance characteristic and visibility, the haze value of the light diffusion element 6 should be preferably within a range of 8 to 82%, more preferably within a range of 30 to 70%, and much more preferably within a range of 40 to 65%.

In the present invention, light emitted from the light guide 3 is emitted in a particular direction such as a normal direction with use of the optical deflector element 4. This emitted light can be emitted in a desired direction with use of the light diffusion element 6 having an anisotropic diffusion characteristic. In this case, the light diffusion element 6 achieves both functions of anisotropic diffusion effect and light deflection effect. For example, a structure in which a number of elongated lenticular lenses extending in one direction are arrayed in parallel to each other or a structure in which a number of cylindrical lenses extending by a required dimension in one direction are provided discretely in parallel to each other may be used as the concave/convex structure. In this structure, both functions of anisotropic diffusion effect and light deflection effect can be added by forming the cross-sectional shape of the structure into an asymmetrical shape.

In the present invention, for the purpose of adjusting the viewable angle of the light source device and to improve the quality, the optical deflector element 4 and/or the light diffusion element 6 may contain light diffusion material. As light diffusion material of this kind, it is possible to use fine transparent particles having a different refractive index from that of basic material forming the optical deflector element 4 or light diffusion element 6. For example, the light diffusion material may consist of silicone beads, polystyrene, polymethyl methacrylate, or homopolymer or copolymer of fluorinated methacrylate, or the like. For the light diffusion material, it is necessary to select properly contents, particle diameter, refractive index, and the like in order not to impair the effect of narrowing the view field by the optical deflector element 4 and appropriate diffusion effect of the light diffusion element 6. For example, if a difference between the refractive index of the light diffusion material and that of the basic material forming the optical deflector element 4 or light diffusion element 6 is too small, diffusion effect is weak. Otherwise, if the difference is too great, excessive diffusion/refraction effect is caused. Hence, the difference in refractive index should be preferably within a range of 0.01 to 0.1, more preferably within a range of 0.03 to 0.08, and much more preferably within a range of 0.03 to 0.05. If the particle diameter of the diffusion material is too great, diffusion is so strong that glare or lowering of luminance is caused. Otherwise, if the particle diameter is too small, coloring is caused. Therefore, the average particle diameter should be preferably within a range of 0.5 to 20 µm, more preferably within a range of 2 to 15 µm, and much more preferably within a range of 2 to 10 µm.

A liquid crystal display device is constructed by providing a liquid crystal display element on the light emitting surface (e.g., the light emitting surface 62 of the light diffusion element 6) of a light source device constituted by the primary light source 1, light source reflector 2, light guide 3, optical deflector element 4, light reflection element 5, and light diffusion element 6 as described above. The liquid crystal display device is observed by an observer through the liquid crystal display element from upside in FIG. 1. In the present invention, sufficiently collimated light having narrow distribution can be let enter into the liquid crystal display element from the light source device. Therefore, inversion of gradation or the like is not caused at the liquid crystal display element, and image display with excellently uniform brightness and hue can be achieved. In addition, irradiation of light concentrated on a desired direction can be attained. Accordingly, it is possible to improve use efficiency of the amount of light emitted from the primary light source with respect to illumination in this direction.

EXAMPLES

Hereinafter, the present invention will be described specifically with reference to examples and comparative examples. In the following examples and comparative examples, measurement of respective characteristic values were carried out as follows.

Measurement of Normal Luminance and Full Width at Half Maximum of Light Intensity of the Light Source Device A cold-cathode tube was used as a primary light source. An inverter of a drive circuit thereof (HIU-742A manufactured by HARISON CORP.) was applied with DC 12 V to lighten the cold-cathode tube at a high frequency. Normal luminance was obtained by dividing the surface of the light source device or light guide into 3 rows×5 columns of 20 mm squares to obtain 15 square areas, and by averaging 15 luminance values in the normal direction of the respective square areas. With respect to full width at half maximum of light intensity of the light guide, a black paper sheet having a pin hole of 4 mm φ was fixed to be positioned at the center of the light guide surface. The distance was adjusted such that a measurement circle of a luminance meter was 8 to 9 mm. Further adjustment was made such that the rotation shaft of goniometer rotated about the pin hole as a center in directions vertical and parallel to the lengthwise direction of the cold cathode tube. While the rotation shaft was rotated from +80° to −80° at interval pitch of 1° in each of the directions, luminous intensity distribution of the emitted light was measured by the luminance meter. A peak angle and full width at half maximum of luminous intensity distribution (a spreading angle of distribution of a value of ½ or more of a peak value) were obtained. For full width at half maximum of luminance of the light source device, the viewable angle of the luminance meter was set to 0.1 degree. Adjustment was made such that the rotation shaft of goniometer rotated with the center of the light emitting surface of the light source device taken as a measurement position. While the rotation shaft was rotated from +80° to −80° at interval pitch of 1° in each direction, luminance distribution of the emitted light was measured by the luminance meter, and peak luminance and a peak angle were obtained. For the peak angle, the normal direction of the light source device was set to 0°, and the side of the primary light source was denoted as negative while the opposite side was denoted as positive.

Comparative Example 1

Injection molding was carried out with use of acrylic resin (commercial name: ACRYPET VH5#000 manufactured by MITSUBISHI RAYON CO., LTD.), to prepare a light guide which had one mat-finished face having an average inclination angle of 1.1° and another face as a mirror face. The light guide had a wedge-like and plate-like shape which had a size of 216 mm×290 mm and thickness of 2.0 to 0.7 mm. An elongated prism formed layer was formed on the mirror face of the light guide by acrylic-ultraviolet curable resin such that elongated prisms was formed in parallel to the 216 mm long edge (the shorter edge) of the light guide. In the elongated prism formed layer, elongated prisms were arranged continuously in parallel to each other at pitch of 50 µm wherein the elongated prisms had a prism apex angle of 130°. A cold-cathode tube was provided along the longer edge of the light guide while being covered with a light source reflector (a silver reflection film manufactured by REIKO CO., LTD.), so as to face the side edge face (e.g., the end face of the 2.0 mm thick side) corresponding to the 290 mm long edge (longer edge) of the light guide. Further, to the other side end face, a light diffusive reflection film (commercial name: E60 manufactured by TORAY INDUSTRIES INC.) was stuck, and a reflection sheet was provided on the face (back face) where the elongated prisms were arranged. This structure was assembled into a frame. With respect to this light guide, the maximum peak of luminous intensity distribution of emitted light in a plane vertical to both the light incident face and the light-emitting face was 70 degrees relative to the normal direction of the light emitting face, and the full width at half maximum was 22.5 degrees.

On the other side, a prism sheet having elongated prisms arranged continuously in parallel to each other at pitch of 56.5 μm was prepared on one surface of a polyester film having thickness of 188 μm with use of acrylic-ultraviolet curable resin having a refractive index of 1.5064. The cross-sectional shape of an elongated prism was defined by two straight lines connecting three points, i.e., point 1 (−11.500, 65.209), point 2 (0.000, 0.000), and point 4 (15.443, 12.000) in this order, expressed in the (x, z) coordinate system, and by a convex curve connecting the point 4 and another point 5 (45.000, 65.209) and having a radius of 527.817 μm where the apex of the prism was set to the point of origin of the coordinate system and the pitch P of the elongated prisms was 1.

A prism sheet thus obtained was set on the light guide such that the face where the elongated prisms were formed faced the light emitting face (the mat-finished face) of the light guide, the ridge lines of the prisms were parallel to the light incident face of the light guide, and the first prism face (the prism face corresponding to a line connecting the points 1 and 2 of the cross-sectional shape described above) is situated in the light source side. Thus, a light source device was attained.

This light source device was evaluated as follows. That is, distribution of emitted light in a plane vertical to both of the light incident face and the light emitting face was obtained. A luminance ratio of peak light where Comparative Example 7 described later is taken as a reference and an angle of the peak light are shown in Table 2. Light was emitted from the light source device, and appearance of the light emitting surface thereof was observed with eyes. Presence or absence of black stripes and Moire pattern is also shown in Table 2.

Examples 1 to 18 and Comparative Examples 2 to 3

Prism sheets were prepared in the same manner as described in Comparative Example 1 except that the cross-sectional shape of each elongated prism was arranged as indicated in Table 1 (the cross-sectional shape was defined by connecting points 1 to 5 in this order). Each of prism sheets obtained was set on the same light guide as that in Comparative Example 1 in the same manner as in Comparative Example 1. Thus, light source devices were attained. In Table 1, the inclination angle of the top end flat face of an elongated prism is expressed as being negative if the top end flat face is inclined upward to the right (i.e. toward the side opposite to the primary light source) or as being positive if the top end flat face is inclined upward to the left (i.e. toward the side of the primary light source). This is also in Tables 3 and 5). The light source devices were evaluated in the same manner as in Comparative Example 1. Results of the evaluation are shown in Table 2.

TABLE 1

| | Coordinate of Prism Shape | | | | | Shape of Prism Face | |
|---|---|---|---|---|---|---|---|
| | | | | | | First Prism Face (Point1~Point2) | Second Prism Face (Point3~Point5) P.3~P.4 |
| | Point1 | Point2 | Point3 | Point4 | Point5 | | |
| Com. Ex. 1 | (−11.500, 65.209) | (0.000, 0.000) | (0.000, 0.000) | (15.443, 12.000) | (45.000, 65.209) | Flat | Flat |
| Example 1 | (−11.500, 65.209) | (−0.049, 0.280) | (0.717, 0.922) | (15.443, 12.000) | (45.000, 65.209) | Flat | Flat |
| Example 2 | (−11.500, 65.209) | (−0.088, 0.501) | (0.778, 1.001) | (15.443, 12.000) | (45.000, 65.209) | Flat | Flat |
| Example 3 | (−11.500, 65.209) | (−0.125, 0.707) | (0.815, 1.049) | (15.443, 12.000) | (45.000, 65.209) | Flat | Flat |
| Example 4 | (−11.500, 65.209) | (−0.157, 0.891) | (0.828, 1.065) | (15.443, 12.000) | (45.000, 65.209) | Flat | Flat |
| Com. Ex. 2 | (−11.500, 65.209) | (−0.185, 1.049) | (0.815, 1.049) | (15.443, 12.000) | (45.000, 65.209) | Flat | Flat |
| Example 5 | (−11.500, 65.209) | (−0.207, 1.175) | (0.777, 1.001) | (15.443, 12.000) | (45.000, 65.209) | Flat | Flat |
| Example 6 | (−11.500, 65.209) | (−0.223, 1.264) | (0.717, 0.922) | (15.443, 12.000) | (45.000, 65.209) | Flat | Flat |
| Example 7 | (−11.500, 65.209) | (−0.232, 1.316) | (0.634, 0.816) | (15.443, 12.000) | (45.000, 65.209) | Flat | Flat |
| Example 8 | (−11.500, 65.209) | (−0.234, 1.327) | (0.532, 0.685) | (15.443, 12.000) | (45.000, 65.209) | Flat | Flat |
| Example 9 | (−11.500, 65.209) | (−0.099, 0.559) | (1.433, 1.845) | (15.443, 12.000) | (45.000, 65.209) | Flat | Flat |
| Example 10 | (−11.500, 65.209) | (−0.177, 1.002) | (1.555, 2.002) | (15.443, 12.000) | (45.000, 65.209) | Flat | Flat |
| Example 11 | (−11.500, 65.209) | (−0.249, 1.414) | (1.630, 2.098) | (15.443, 12.000) | (45.000, 65.209) | Flat | Flat |
| Example 12 | (−11.500, 65.209) | (−0.314, 1.783) | (1.655, 2.130) | (15.443, 12.000) | (45.000, 65.209) | Flat | Flat |
| Com. Ex. 3 | (−11.500, 65.209) | (−0.370, 2.098) | (1.630, 2.098) | (15.443, 12.000) | (45.000, 65.209) | Flat | Flat |
| Example 13 | (−11.500, 65.209) | (−0.414, 2.349) | (1.554, 2.002) | (15.443, 12.000) | (45.000, 65.209) | Flat | Flat |
| Example 14 | (−11.500, 65.209) | (−0.446, 2.529) | (1.433, 1.845) | (15.443, 12.000) | (45.000, 65.209) | Flat | Flat |
| Example 15 | (−11.500, 65.209) | (−0.464, 2.623) | (1.268, 1.632) | (15.443, 12.000) | (45.000, 65.209) | Flat | Flat |
| Example 16 | (−11.500, 65.209) | (−0.468, 2.655) | (1.064, 1.369) | (15.443, 12.000) | (45.000, 65.209) | Flat | Flat |
| Example 17 | (−11.500, 65.209) | (−0.044, 0.250) | (0.389, 0.500) | (15.443, 12.000) | (45.000, 65.209) | Flat | Flat |
| Example 18 | (−11.500, 65.209) | (−0.132, 0.751) | (1.167, 1.501) | (15.443, 12.000) | (45.000, 65.209) | Flat | Flat |

| | Shape of Prism Face | | Inclination Angle | Length Ratio of Top End | Angle γ (°) between | Angle α (°) between | Angle β (°) between |
|---|---|---|---|---|---|---|---|
| | Second Prism Face (Point3~Point5) Point4~Point5 | Top End Flat Face (Point2~Point3) | (°) of Top End Flat Face | Flat Face (to Prism Pitch) | 1st and 2nd Prism Faces | 1st Prism Face and Flat Face | 2nd Prism Face and Flat Face |
| Com. Ex. 1 | Curve(R = 527.817 μm) | None | — | — | 47.8 | — | — |
| Example 1 | Curve(R = 527.817 μm) | Flat | −40 | 0.0177 | 47.8 | 60 | 167.8 |
| Example 2 | Curve(R = 527.817 μm) | Flat | −30 | 0.0177 | 47.8 | 70 | 157.8 |
| Example 3 | Curve(R = 527.817 μm) | Flat | −20 | 0.0177 | 47.8 | 80 | 147.8 |

TABLE 1-continued

|  | | | | | | | |
|---|---|---|---|---|---|---|---|
| Example 4 | Curve(R = 527.817 μm) | Flat | −10 | 0.0177 | 47.8 | 90 | 137.8 |
| Com. Ex. 2 | Curve(R = 527.817 μm) | Flat | 0 | 0.0177 | 47.8 | 100 | 127.8 |
| Example 5 | Curve(R = 527.817 μm) | Flat | 10 | 0.0177 | 47.8 | 110 | 117.8 |
| Example 6 | Curve(R = 527.817 μm) | Flat | 20 | 0.0177 | 47.8 | 120 | 107.8 |
| Example 7 | Curve(R = 527.817 μm) | Flat | 30 | 0.0177 | 47.8 | 130 | 97.8 |
| Example 8 | Curve(R = 527.817 μm) | Flat | 40 | 0.0177 | 47.8 | 140 | 87.8 |
| Example 9 | Curve(R = 527.817 μm) | Flat | −40 | 0.0354 | 47.8 | 60 | 167.8 |
| Example 10 | Curve(R = 527.817 μm) | Flat | −30 | 0.0354 | 47.8 | 70 | 157.8 |
| Example 11 | Curve(R = 527.817 μm) | Flat | −20 | 0.0354 | 47.8 | 80 | 147.8 |
| Example 12 | Curve(R = 527.817 μm) | Flat | −10 | 0.0354 | 47.8 | 90 | 137.8 |
| Com. Ex. 3 | Curve(R = 527.817 μm) | Flat | 0 | 0.0354 | 47.8 | 100 | 127.8 |
| Example 13 | Curve(R = 527.817 μm) | Flat | 10 | 0.0354 | 47.8 | 110 | 117.8 |
| Example 14 | Curve(R = 527.817 μm) | Flat | 20 | 0.0354 | 47.8 | 120 | 107.8 |
| Example 15 | Curve(R = 527.817 μm) | Flat | 30 | 0.0354 | 47.8 | 130 | 97.8 |
| Example 16 | Curve(R = 527.817 μm) | Flat | 40 | 0.0354 | 47.8 | 140 | 97.8 |
| Example 17 | Curve(R = 527.817 μm) | Flat | −30 | 0.0088 | 47.8 | 70 | 157.8 |
| Example 18 | Curve(R = 527.817 μm) | Flat | −30 | 0.0265 | 47.8 | 70 | 157.8 |

TABLE 2

|  | Luminance Ratio of Peak Light | Angle (°) of Peak Light | Appearance |
|---|---|---|---|
| Com. Ex. 1 | 1.75 | −1 | Black Stripe |
| Example 1 | 1.75 | −2 | Good |
| Example 2 | 1.78 | −2 | Good |
| Example 3 | 1.77 | −2 | Good |
| Example 4 | 1.76 | −2 | Good |
| Com. Ex. 2 | 1.76 | −2 | Moire Pattern |
| Example 5 | 1.76 | −2 | Good |
| Example 6 | 1.72 | −2 | Good |
| Example 7 | 1.72 | −2 | Good |
| Example 8 | 1.71 | −2 | Good |
| Example 9 | 1.74 | −2 | Good |
| Example 10 | 1.77 | −2 | Good |
| Example 11 | 1.76 | −2 | Good |
| Example 12 | 1.75 | −2 | Good |
| Com. Ex. 3 | 1.74 | −2 | Moire Pattern |
| Example 13 | 1.72 | −2 | Good |
| Example 14 | 1.71 | −2 | Good |
| Example 15 | 1.69 | −2 | Good |
| Example 16 | 1.67 | −2 | Good |
| Example 17 | 1.75 | −1 | Good |
| Example 18 | 1.78 | −2 | Good |

Comparative Example 4

A prism sheet was prepared in the same manner as described in Comparative Example 1 except that the cross-sectional shape of each elongated prism was defined by a straight line connecting a point 1 (−19.752, 54.269) and a point 2 (0.000, 0.000) and a convex curve connecting the point 2 and a point 4 (36.748, 54.269) and having a radius of 468.915 μm. The prism sheet thus attained was set on the same light guide as that in Comparative Example 1 in the same manner as in Comparative Example 1. Thus, a light source device was attained. The light source device was evaluated in the same manner as in Comparative Example 1. Results of the evaluation are shown in Table 4.

Examples 19 to 29 and Comparative Example 5

Prism sheets were prepared in the same manner as described in Comparative Example 4 except that the cross-sectional shape of each elongated prism was arranged as shown in Table 3 (the cross-sectional shape was defined by connecting points 1 to 4 in this order). Each of prism sheets obtained was set on the same light guide as that in Comparative Example 1 in the same manner as in Comparative Example 1. Thus, light source devices were attained. The light source devices were evaluated in the same manner as in Comparative Example 1. Results of the evaluation are shown in Table 4.

TABLE 3

|  | Coordinate of Prism Shape | | | | Shape of Prism Face | |
|---|---|---|---|---|---|---|
|  | | | | | First Prism Face | Second Prism Face |
|  | Point1 | Point2 | Point3 | Point4 | (Point1~Point2) | (Point3~Point4) |
| Com. Ex. 4 | (−19.752, 54.269) | (0.000, 0.000) | (0.000, 0.000) | (36.748, 54.269) | Flat | Curve(R = 468.915 μm) |
| Example 19 | (−19.752, 54.269) | (−0.083, 0.229) | (0.683, 0.872) | (36.748, 54.269) | Flat | Curve(R = 468.915 μm) |
| Example 20 | (−19.752, 54.269) | (−0.151, 0.414) | (0.715, 0.914) | (36.748, 54.269) | Flat | Curve(R = 468.915 μm) |
| Example 21 | (−19.752, 54.269) | (−0.213, 0.586) | (0.726, 0.928) | (36.748, 54.269) | Flat | Curve(R = 468.915 μm) |
| Example 22 | (−19.752, 54.269) | (−0.270, 0.740) | (0.715, 0.914) | (36.748, 54.269) | Flat | Curve(R = 468.915 μm) |
| Com. Ex. 5 | (−19.752, 54.269) | (−0.317, 0.872) | (0.683, 0.872) | (36.748, 54.269) | Flat | Curve(R = 468.915 μm) |
| Example 23 | (−19.752, 54.269) | (−0.383, 1.053) | (0.557, 0.711) | (36.748, 54.269) | Flat | Curve(R = 468.915 μm) |
| Example 24 | (−19.752, 54.269) | (−0.168, 0.462) | (1.364, 0.747) | (36.748, 54.269) | Flat | Curve(R = 468.915 μm) |
| Example 25 | (−19.752, 54.269) | (−0.428, 1.176) | (1.451, 1.860) | (36.748, 54.269) | Flat | Curve(R = 468.915 μm) |
| Example 26 | (−19.752, 54.269) | (−0.767, 2.108) | (1.112, 1.424) | (36.748, 54.269) | Flat | Curve(R = 468.915 μm) |
| Example 27 | (−19.752, 54.269) | (−0.253, 0.697) | (2.044, 2.625) | (36.748, 54.269) | Flat | Curve(R = 468.915 μm) |
| Example 28 | (−19.752, 54.269) | (−0.644, 1.769) | (2.175, 2.795) | (36.748, 54.269) | Flat | Curve(R = 468.915 μm) |
| Example 29 | (−19.752, 54.269) | (−1.152, 3.164) | (1.667, 2.138) | (36.748, 54.269) | Flat | Curve(R = 468.915 μm) |

TABLE 3-continued

|  | Shape of Prism Face Top End Flat Face (Point2~Point3) | Inclination Angle (°) of Top End Flat Face | Length Ratio of Top End Flat Face (to Prism Pitch) | Angle γ (°) between 1st and 2nd Prism Faces | Angle α (°) between 1st Prism Face and Flat Face | Angle β (°) between 2nd Prism Face and Flat Face |
|---|---|---|---|---|---|---|
| Com. Ex. 4 | None | — | — | 51.9 | — | — |
| Example 19 | Flat | −40 | 0.0177 | 52.0 | 70 | 168 |
| Example 20 | Flat | −30 | 0.0177 | 52.0 | 80 | 158 |
| Example 21 | Flat | −20 | 0.0177 | 52.0 | 90 | 148 |
| Example 22 | Flat | −10 | 0.0177 | 52.0 | 100 | 138 |
| Com. Ex. 5 | Flat | 0 | 0.0177 | 52.0 | 110 | 128 |
| Example 23 | Flat | 20 | 0.0177 | 52.0 | 130 | 118 |
| Example 24 | Flat | −40 | 0.0354 | 52.2 | 70 | 168 |
| Example 25 | Flat | −20 | 0.0354 | 52.2 | 90 | 148 |
| Example 26 | Flat | 20 | 0.0354 | 52.1 | 130 | 108 |
| Example 27 | Flat | −40 | 0.0531 | 52.3 | 70 | 168 |
| Example 28 | Flat | −20 | 0.0531 | 52.3 | 90 | 148 |
| Example 29 | Flat | 20 | 0.0531 | 52.2 | 130 | 108 |

TABLE 4

|  | Luminance Ratio of Peak Light | Angle (°) of Peak Light | Appearance |
|---|---|---|---|
| Com. Ex. 4 | 1.64 | −1 | Black Stripe |
| Example 19 | 1.63 | −2 | Good |
| Example 20 | 1.65 | −2 | Good |
| Example 21 | 1.66 | −2 | Good |
| Example 22 | 1.63 | −2 | Good |
| Com. Ex. 5 | 1.63 | −2 | Moire Pattern |
| Example 23 | 1.62 | −2 | Good |
| Example 24 | 1.61 | −2 | Good |
| Example 25 | 1.63 | −2 | Good |
| Example 26 | 1.55 | −2 | Good |
| Example 27 | 1.59 | −2 | Good |
| Example 28 | 1.62 | −2 | Good |
| Example 29 | 1.50 | −2 | Good |

Comparative Example 6

A prism sheet was prepared in the same manner as described in Comparative Example 1 except that the cross-sectional shape of each elongated prism was defined by a straight line connecting a point 1 (−14.178, 61.410) and a point 2 (0.000, 0.000) and a convex curve connecting the point 2 and a point 4 (42.322, 61.410) and having a radius of 504.324 μm. The prism sheet thus attained was set on the same light guide as that in Comparative Example 1 in the same manner as in Comparative Example 1. Thus, a light source device was attained. The light source device was evaluated in the same manner as in Comparative Example 1. Results of the evaluation are shown in Table 4.

Examples 30 to 32

Prism sheets were prepared in the same manner as described in Comparative Example 6 except that the cross-sectional shape of each elongated prism was arranged as shown in Table 5 (the cross-sectional shape was defined by connecting points 1 to 4 in this order). Each of prism sheets obtained was set on the same light guide as that in Comparative Example 1 in the same manner as in Comparative Example 1. Thus, light source devices were attained. The light source devices were evaluated in the same manner as in Comparative Example 1. Results of the evaluation are shown in Table 6.

TABLE 5

|  | Coordinate of Prism Shape | | | | Shape of Prism Face | |
|---|---|---|---|---|---|---|
|  | Point1 | Point2 | Point3 | Point4 | First Prism Face (Point1~Point2) | Second Prism Face (Point3~Point4) |
| Com. Ex. 6 | (−14.178, 61.410) | (0.000, 0.000) | (0.000, 0.000) | (42.322, 61.410) | Flat | Curve(R = 504.324 μm) |
| Example 30 | (−14.178, 61.410) | (−0.180, 0.781) | (1.497, 1.870) | (42.322, 61.410) | Flat | Curve(R = 504.324 μm) |
| Example 31 | (−14.178, 61.410) | (−0.298, 1.292) | (1.581, 1.976) | (42.322, 61.410) | Flat | Curve(R = 504.324 μm) |
| Example 32 | (−14.178, 61.410) | (−0.543, 2.352) | (1.336, 1.668) | (42.322, 61.410) | Flat | Curve(R = 504.324 μm) |

|  | Shape of Prism Face Top End Flat Face (Point2~Point3) | Inclination Angle (°) of Top End Flat Face | Length Ratio of Top End Flat Face (to Prism Pitch) | Angle γ (°) between 1st and 2nd Prism Faces | Angle α (°) between 1st Prism Face and Flat Face | Angle β (°) between 2nd Prism Face and Flat Face |
|---|---|---|---|---|---|---|
| Com. Ex. 6 | None | — | — | 51.2 | — | — |
| Example 30 | Flat | −33 | 0.0354 | 51.5 | 70 | 161.8 |
| Example 31 | Flat | −20 | 0.0354 | 51.5 | 83 | 148.8 |
| Example 32 | Flat | 20 | 0.0354 | 51.4 | 123 | 108.8 |

TABLE 6

|  | Luminance Ratio of Peak Light | Angle (°) of Peak Light | Appearance |
| --- | --- | --- | --- |
| Com. Ex. 6 | 1.77 | −1 | Black Stripe |
| Example 30 | 1.73 | −2 | Good |
| Example 31 | 1.79 | −2 | Good |
| Example 32 | 1.67 | −2 | Good |

Comparative Example 7

A light source device was attained in the same manner as described in Comparative Example 1 except that each elongated prism of the prism sheet had two flat prism faces so as to have the cross-sectional shape of an isosceles triangle with an apex angle of 64.5 degrees ($\rho = \sigma = 32.7$ degrees. Luminance distribution of the emitted light in a plane perpendicular to both the light incident face and light emitting face of the light guide was measured. Peak luminance value obtained was set to 1.00 and an angle of peak light was 0 degree.

INDUSTRIAL APPLICABILITY

Since the optical deflector element according to the present invention has elongated prisms each being provided with a top end flat face having an inclination angle within specific range, a light source device of high quality free from occurrence of black stripes or Moire pattern can be provided without lowering luminance.

What is claimed is:

1. An optical deflector element comprising:
a light incoming surface into which enters a light emitted from a light-emitting face of a light guide having a light-incident face into which a light emitted from a primary light source enters; and
a light outgoing surface which is positioned on a side opposite to the light incoming surface and from which the light is emitted,
wherein plural elongated prisms are arrayed in parallel with each other on the light incoming surface, and each of the elongated prisms is constituted by a top end flat face having an inclination angle of 1 to 50 degrees and positioned at a top end part of the elongated prism, a first prism face positioned on one side of the top end flat face, and a second prism face positioned on another side of the top end flat face,
wherein the first prism face is a flat face and the second prism face is a curve face.

2. The optical deflector element as set forth in claim 1, wherein the top end flat face has a size of 0.008P to 0.088P in a cross section perpendicular to an elongated direction of the elongated prism where P is pitch of the elongated prism.

3. The optical deflector element as set forth in claim 1, wherein at least one of the first and second prism faces is constituted by a convex curve face.

4. The optical deflector element as set forth in claim 3, wherein the convex curve face has a cross-section perpendicular to the elongated direction of the elongated prism, the cross-section having an arc-like shape.

5. The optical deflector element as set forth in claim 4, wherein a ratio r/P of a curvature radius r of the convex curve face to the pitch P of the elongated prisms is 2 to 50.

6. The optical deflector element as set forth in claim 3, wherein the prism face constituted by the convex curve face has a ratio d/P of a maximum distance d between the prism face and a virtual plane connecting a top edge and a bottom edge to the pitch P of the elongated prisms, the ratio d/P being 0.1 to 5%.

7. The optical deflector element as set forth in claim 1, wherein at least one of the first and second prism faces is constituted by plural faces, and each of the plural faces is constituted by a flat face or convex curve face.

8. The optical deflector element as set forth in claim 7, wherein the plural faces include a flat face adjacent to the top end flat face, and a convex curve face adjacent to the flat face.

9. The optical deflector element as set forth in claim 8, wherein the convex curve face has a cross-section perpendicular to the elongated direction of the elongated prism, the cross-section having an arc-like shape.

10. The optical deflector element as set forth in claim 9, wherein a ratio r/P of a curvature radius r of the convex curve face to the pitch P of the elongated prisms is 2 to 50.

11. The optical deflector element as set forth in claim 7, wherein any of the first and second prism faces that is constituted by plural faces has a ratio d/P of a maximum distance d between the prism face and a virtual plane connecting a top edge and a bottom edge to the pitch P of the elongated prisms, the ratio d/P being 0.1 to 5%.

12. A light source device comprising:
a primary light source;
a light guide having a light-incident face into which light emitted from the primary light source enters, and a light-emitting face from which guided light is emitted; and
the optical deflector element as set forth in any one of claims 1 to 11 provided adjacent to the light guide on a side of the light-emitting face thereof.

13. The light source device as set forth in claim 12, wherein an inclination angle of the top end flat face of the optical deflector element is an angle at which peak light in light emitted from the light-emitting face of the light guide does not enter into the optical deflector element through the top end flat face of the optical deflector element.

14. The light source device as set forth in claim 13, wherein the peak light is emitted from the light-emitting face in a direction at an angle of 10° to 40° with respect to the light-emitting face.

15. The light source device as set forth in claim 12, wherein the first prism face of the elongated prism is positioned closer to the primary light source than the second prism face, the first prism face is constituted by a flat face, the second prism face is constituted by a convex curve face or plural faces, and each of the plural faces is constituted by a flat face or a convex curve face.

* * * * *